March 20, 1962 R. F. J. FILIPOWSKY 3,026,482

DETECTOR FOR RECOGNIZING EITHER OF TWO SIGNALS, EACH CONSISTING OF INDIVIDUAL CYCLIC FREQUENCY DEVIATION OF A CARRIER

Filed Dec. 9, 1957

INVENTOR
Richard F. J. Filipowsky
BY Maury I. Hull
ATTORNEY

United States Patent Office 3,026,482
Patented Mar. 20, 1962

3,026,482

DETECTOR FOR RECOGNIZING EITHER OF TWO SIGNALS, EACH CONSISTING OF INDIVIDUAL CYCLIC FREQUENCY DEVIATION OF A CARRIER

Richard F. J. Filipowsky, Glen Burnie, Md., assignor to Westinghouse Electric Corporation, East Pittsburgh, Pa., a corporation of Pennsylvania Filed Dec. 9, 1957, Ser. No. 701,547
4 Claims. (Cl. 328—132)

This invention relates to improvements in apparatus for communicating by the use of coded signals, and more particularly to improvements in such apparatus of the type employing frequency cycling and especially suitable for handling binary information.

A number of prior art systems and apparatus for transmitting information by frequency variation have been devised. For example, one such prior art system serially transmits signals of a first frequency and a second frequency to provide a mark signal and serially transmits signals of the second frequency and the first frequency for a space signal. Another prior art device simultaneously transmits signals of two frequencies for a mark signal and signals of two different frequencies for a space signal. Still another prior art device especially suitable for transmitting binary information employs a positive pulse followed by a negative pulse to transmit a binary (1) and a negative pulse followed by a positive pulse to transmit a binary (0).

All of these prior art systems and apparatus are characterized by a number of disadvantages in that they are susceptible to jamming and interference, particularly by a cross-correlated transmission, that is, similarly modulated carriers entering the transmission band due to poor selectivity. In some prior art apparatus, the mere reception of an unmodulated carrier of correct radio-frequency can simulate a signal in the receiver. In other cases where a jammer of the wobbulation type is employed to provide deliberate jamming, the side bands on adjacent channels occasionally contain the correct frequency to simulate a signal at the receiver, thereby producing a disturbance and error in the received information.

The apparatus of the instant invention overcomes these and other disadvantages of the prior art by utilizing or allocating a prescribed frequency change to transmit a binary (1) and a different, but analogous frequency change, to transmit a binary (0). Means is employed to insure that the receiver is not influenced by spurious received energy, by utilizing or evaluating several significant characteristics of the wave forms of the transmitted signals. Separate units or circuits in the receiver are used to investigate each of these characteristics and are interconnected in a coincidence circuit which will pass or produce a signal in the output of the receiver only if all of the characteristics exist or coincide in the proper predetermined manner. The signal characteristics employed are (1) the two extreme frequencies instantaneously reached throughout the cycling process; (2) the time interval between the instants when these two frequencies are reached; and (3) the slope or rate of the frequency change, as the signal changes from one extreme frequency to the other extreme frequency. As aforementioned, the transmitted signal has a fourth characteristic which is the sequence in which the two extreme frequencies follow each other, but since this characteristic carries the actual information it is not used to discriminate the signal from noise.

Accordingly, a primary object of the instant invention is to provide new and improved signalling apparatus employing frequency cycling.

Another object is to provide new and improved frequency cycling signalling apparatus in which a plurality of signal characteristics are utilized to discriminate the desired signal from noise and spurious or undesired signals.

Still another object is to provide new and improved frequency cycling apparatus which is not readily susceptible to jamming, and in which the possibility of error is reduced to a minimum.

Other objects and advantages will become apparent after a study of the accompanying drawings, when read in connection with the following specification, in which.

Figures 1A, 1B:
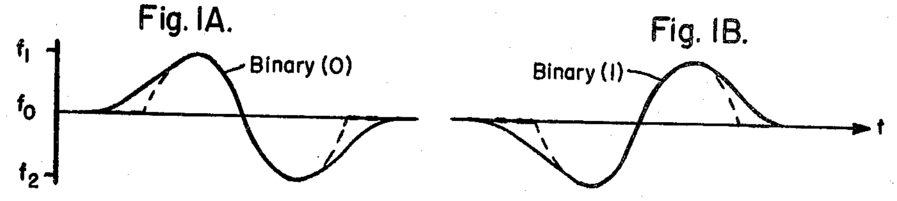
FIGURES 1A and 1B are graphs illustrating the wave forms of the signals employed for transmitting two different bits of intelligence, for example, a binary (0) and a binary (1)

Particular reference is made now to FIGS. 1A and 1B where it will be noted a binary (0) is produced by varying the transmitted frequency from a nominal value $f_0$ first to a value $f_1$ above the frequency $f_0$ and then to a value $f_2$ below the frequency $f_0$, while a binary (1) is transmitted by first varying the frequency from $f_0$ to the value $f_2$ and thereafter increasing the frequency to the value $f_1$, and thereafter returning the frequency to the value $f_0$. The manner of cycling may depart somewhat from a precisely sinusoidal form indicated by the dashed-line portions of the curves of FIGS. 1A and 1B, and may have exponentially tapered rise and decay slopes or tails, as indicated by the solid line wave forms.

Figure 2:
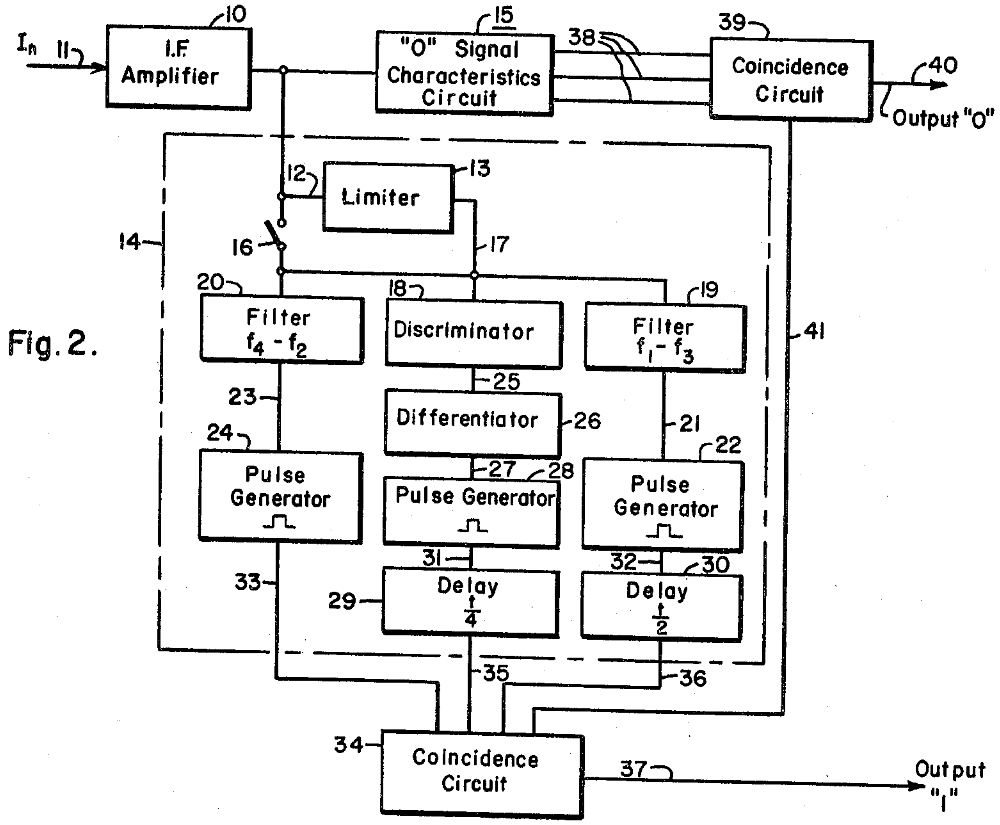
FIG. 2 is an electrical circuit diagram, in block form, of apparatus according to the preferred embodiment of the invention.

Particular reference should be made now to FIG. 2. An intermediate frequency amplifier which may be of any convenient design is shown in block form and designated 10, and is adapted to have applied thereto on lead means 11 the signal bearing the information or intelligence to be translated. The amplifier 10 is constructed and arranged to pass the entire channel band required for operation of the apparatus, for example, 80 to 100 kilocycles per second without distortion, but preferably rejects any neighboring channels to the highest extent possible.

The output of the intermediate frequency amplifier 10 is applied to lead means 12 and thence to a limiter circuit of any convenient design shown in block form and designated 13. The limiter 13 may be the usual or normal type of limiter such as those used in frequency modulation receivers. The aforementioned limiter 13 is part of the binary (1) signal characteristic ascertaining circuits which are shown in dashed outline and designated by the reference numeral 14. Also, energized from the output of the aforementioned I.F. amplifier 10 is a binary (0) signal characteristic ascertaining circuit designated 15 and hereinafter to be more fully described.

Figure 3:
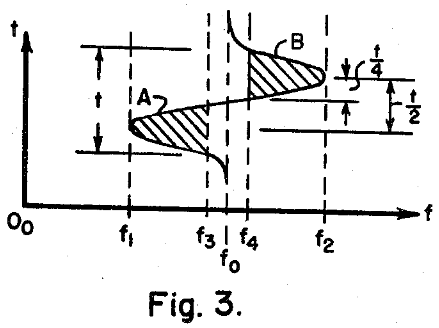
FIG. 3 is a graph illustrating the operation of the apparatus of FIG. 2.

As aforementioned, the circuit for ascertaining that the characteristics of the binary (1) signal are the desired ones, included in the apparatus 14, comprises a limiter 13 which may, if desired, be cut out of the circuit by closing the switch 16 which is provided for purposes which will be hereinafter more fully apparent. The output of the aforementioned limiter 13 is applied by lead means 17 to a number of different circuit elements including a discriminator shown in block form and designated 18, the discriminator 18 being, for example, of the type conventionally used in frequency modulation receivers. The output of the limiter 13 is also applied by lead means 17 to a filter shown in block form and designated 19, the filter 19 being constructed and arranged to cover slightly less than half the aforementioned intermediate frequency band, or the frequency range $f_1$ to $f_3$ as shown in FIG. 3, and thus integrating over the area A of the wave form as shown in FIG. 3, which represents a binary (1) signal of the most preferable wave form. The output of the limiter 13 on lead means 17 is also applied to an additional filter shown in block form and designated 20, the filter 20 also covering slightly less than half the intermediate frequency band, or the frequency range $f_4$ to $f_2$ as shown in FIG. 3, and integrating over the area B of the signal wave form as shown in the graph of FIG. 3.

The output of the aforementioned filter 19 is applied by lead means 21 to a pulse generating circuit shown in block form and designated 22, which is constructed and arranged to produce a clear-cut pulse whenever the input thereof on lead 21 exceeds a pre-fixed threshold value. In like manner, the output of the aforementioned filter 20 is applied by lead means 23 to a pulse generator 24 which is constructed and arranged to produce a clear-cut pulse whenever the input to the pulse generator 24 exceeds a pre-fixed threshold value.

As hereinbefore stated, one of the signal characteristics which is utilized in the instant apparatus to discriminate the signal from noise is the slope or rate of the frequency change when the signal changes from one extreme frequency to the other extreme frequency. Accordingly, the output of the aforementioned discriminator 18 is applied by lead means 25 to a differentiator circuit 26 which is constructed and arranged to measure the slope of the transition from area A to area B, or from $f_1$ to $f_2$, FIG. 3, of the original wave form applied to the circuit on lead 12. When the slope has certain predetermined or preselected characteristics, the differentiator 26 is constructed and arranged to apply a signal on lead 27 suitable for triggering a pulse generator 28, which is constructed and arranged to produce a clear-cut pulse, when the input thereto on lead 27 has a predetermined value determined by the slope of the aforementioned wave form of FIG. 3.

A pair of delay networks 29 and 30 is provided, delay network 29 having the pulse output of pulse generator 28 applied thereto by lead means 31, and delay network 30 having the pulse output of pulse generator 22 applied thereto by lead means 32. The delay network 29 is constructed and arranged to provide a delay of $t/4$, $t$ being the time required for the production of the entire wave form as illustrated in FIG. 3, and the time $t/4$ being also illustrated in FIG. 3, to which particular attention is directed. The delay network 30 is constructed and arranged to provide a delay equal to $t/2$ as illustrated by FIG. 3. The delay networks 29 and 30 serve to bring the output of all three branches or all three pulse generators 24, 28 and 22 into time coincidence when the limiter 13 is energized by a binary (1) signal having the desired wave form, for as previously stated, two of the signal characteristics utilized to discriminate the signal from noise are the slope and the time interval between the instants when the two extreme frequencies are reached in the cycling process. The pulse output of pulse generator 24 is applied by lead means 33 to a coincidence circuit shown in block form and designated 34, while the output of the delay network 29 is applied by lead means 35 to the coincidence circuit 34 and the output of the delay network 30 is applied by lead means 36 to the coincidence circuit 34. The coincidence circuit 34 is constructed and arranged to ascertain the time coincidence of the three inputs thereto on leads 33, 35 and 36, and if coincidence is established, the coincidence circuit is further constructed and arranged to deliver on lead 37 a trigger pulse for producing a binary (1) digit.

The pulse generators 24, 28 and 22 may be omitted if desired and the output of the filter 20 applied directly to a coincidence circuit similar to 34, with the output of the differentiator 26 after delay at 29 being applied to the coincidence circuit similar to 34, and the output of filter 19 after delay at 30 being applied to the coincidence circuit similar to 34, the similar coincidence circuit being constructed and arranged to utilize the inputs thereto if they are all in substantial coincidence to produce the binary (1) output signal.

As previously stated, a binary (0) circuit is provided and is generally designated 15. This binary (0) signal characteristics ascertaining circuit 15 may be similar to the circuit 14 hereinbefore described in detail except that in the apparatus of circuit or block 15, the delay network $t/2$ similar to that designated by the reference numeral 30 is in the other or opposite filter output, it being recalled that a binary (0) is produced by first cyclically increasing the frequency above the nominal value and thereafter decreasing it below the nominal value, producing a wave form complementary to, or substantially 180 degrees out of phase with, the wave form of FIG. 3. The three outputs from the signal characteristics ascertaining apparatus 15 are applied by leads 38 to an additional coincidence circuit 39 which may be similar to the aforedescribed coincidence circuit 34 and which, when the signals on all of the three leads 38 are in substantial coincidence, is constructed and arranged to supply on lead 40 an output pulse representing a binary (0).

The coincidence circuits 39 and 34 are operatively connected together by lead means 41. Cross-connections between the two coincidence circuits 34 and 39 are required because it is necessary that each of the coincidence circuits be constructed and arranged to be disabled for approximately a time interval $3t/4$ after either circuit has indicated a genuine symbol. This is desirable since in a series of equal or like symbols, there is necessarily also the sequence for the opposite symbol contained in the wave transmission without being especially generated at the transmitting end. The operative connection 41 between the two coincidence circuits is also desirable because errors are, if possible, to be avoided in the output of the apparatus, such as those which would be produced by jamming; both coincidence circuits are accordingly constructed and arranged to be mutually blocked if both circuits are in condition at the same time to supply outputs, with the result that neither coincidence circuit 39 nor 34 supplies an output when both are in condition to supply an output. This arrangement is desirable because in the elimination of errors from the output a "no-signal" condition is preferable to a "wrong-signal" condition.

The aforedescribed apparatus is accordingly well suited to perform the aforementioned purposes or objects of the invention to provide binary or other coded data transmission apparatus which is substantially jamming-proof, and which prevents wrong symbol reception even through the most severe disturbances.

The wave forms for producing a binary (1) and binary (0) could, if desired, be reversed from those shown, suitable rearrangement of the circuit of FIG. 2 being made.

Under conditions of severe continuous wave jamming, operation may be improved by closing switch 16 thereby cutting limiter 13 out of the circuit. It should be understood that an additional switch, not shown, corresponding to switch 16 is provided in the apparatus of block 15.

Whereas the invention has been shown and described with particular reference to its use with the binary code, it should be understood that other codes, for example a mark-space code, could be employed.

Whereas the invention has been shown and described with respect to a preferred embodiment thereof which gives satisfactory results, it should be understood that changes may be made and equivalents substituted without departing from the spirit and scope of the invention.

I claim as my invention:

1. In frequency cycling signal apparatus, in combination, input means adapted to have an alternating current signal of variable frequency applied thereto the frequency of which is cyclically varied within preselected upper and lower frequency limits at a preselected rate, pulse generator means connected to said input means and responsive to said signal to generate a pair of coincident pulses when the time interval between the instants of said signal attains its upper and lower frequency limits corresponding to a preselected value, other pulse generator means operatively connected to said input means and including differentiator means and delay means and constructed and arranged for generating a third pulse coincident with said pair of pulses when the slope of the wave form of the signal has a predetermined value as the frequency changes between the upper and lower frequency limits, and coincidence means operatively connected to both the pulse generator means and having the generated pulses applied thereto, said coincidence means being constructed and arranged to generate an output pulse while the three pulses applied thereto are in time coincidence.

2. Frequency cycling signal apparatus for coded communication comprising, in combination, input means, said input means being adapted to have an alternating current signal of varying characteristics including varying frequency applied thereto, differentiator means operatively connected to said input means, pulse generator means operatively connected to said differentiator means and constructed and arranged to generate a pulse when the wave form of the signal applied to said input means and to said differentiator means has a preselected slope over a preselected portion thereof, other pulse generator means operatively connected to said input means responsive to said signal to provide a pair of coincident pulses when the time interval between the instants of maximum and minimum frequency of the signal applied to the input means has a preselected value, and coincidence means operatively connected to both the pulse generator means and having all of the pulses applied thereto and constructed and arranged to generate an output signal when all of the pulses applied thereto are in coincidence.

3. In frequency cycling signal apparatus for coded communication, in combination, input means adapted to have an alternating current signal of variable frequency applied thereto having an instant frequency which is cyclically varied at a preselected rate between first and second preselected frequencies, first and second filter means operatively connected to said input means and having said signal applied thereto, first and second pulse generator means operatively connected to said first and second filter means respectively and constructed and arranged to generate pulses at substantially the instants that said signal attains the first and second frequencies respectively, means for delaying the output of one of said pulse generator means by a preselected time interval corresponding to a preselected fraction of the cycling rate of said signal, coincidence means having the delayed output of the one pulse generator means and the output of the other pulse generator means applied thereto, and additional pulse generator means operatively connected to said input means and constructed and arranged to provide a delayed pulse when the wave form of the signal has a preselected characteristic slope, said last-named delayed pulse being applied to said coincidence means, said coincidence means being constructed and arranged to provide an output pulse when all of the inputs applied thereto are in substantial coincidence.

4. In frequency cycling signal apparatus for coded communication, in combination, input means adapted to have an alternating current signal applied thereto which varies from a first normal frequency to a second frequency which differs by a predetermined amount from said first frequency and thence to a third frequency which differs by the same predetermined amount but in the opposite direction from the first frequency and thereafter reassumes said first frequency, said frequency variations above and below the normal frequency being substantially symmetrical with respect to time, first signal characteristic ascertaining means operatively connected to said input means for ascertaining the time interval between the instant the applied signal attains said second frequency and the instant said applied signal attains said third frequency and providing an output when said time interval has a preselected value, second signal characteristic ascertaining means operatively connected to said input means for ascertaining the slope of the variation between said second and third frequencies, said second signal characteristic ascertaining means being constructed and arranged to provide an output when said slope has a predetermined value, delay means operatively connected to said second signal characteristic ascertaining means for delaying said last-named output a preselected other time interval, and coincidence means operatively connected to said first signal characteristic ascertaining means and to said delay means and having the output of the first signal characteristic ascertaining means and the delayed output of the second signal characteristic ascertaining means applied thereto, said coincidence means being constructed and arranged to provide an output pulse when the inputs applied thereto are in substantial coincidence.

References Cited in the file of this patent

UNITED STATES PATENTS

| | | |
|---|---|---|
| 2,463,402 | Maki | Mar. 1, 1949 |
| 2,465,925 | Purlington | Mar. 29, 1949 |
| 2,489,297 | Labin | Nov. 29, 1949 |
| 2,503,371 | Bachelet | Apr. 11, 1950 |
| 2,504,976 | Grieg | Apr. 25, 1950 |
| 2,522,609 | Gloess | Sept. 19, 1950 |
| 2,700,149 | Stone | Nov. 18, 1952 |
| 2,729,809 | Hester | Jan. 3, 1956 |
| 2,779,933 | Bradburd | Jan. 29, 1957 |
| 2,931,982 | Coeterier | Apr. 5, 1960 |